United States Patent [19]
Fuji

[11] Patent Number: 5,563,858
[45] Date of Patent: Oct. 8, 1996

[54] MULTI-BEAM RECORDING-REPRODUCTION APPARATUS WITH IMPROVED POSITIONING ACCURACY AND TRACK COUNTING

[75] Inventor: Hiroshi Fuji, Soraku-gun, Japan

[73] Assignee: Sharp Kabushiki Kaisha, Osaka, Japan

[21] Appl. No.: 325,892

[22] Filed: Oct. 18, 1994

[30]   Foreign Application Priority Data

Oct. 19, 1993   [JP]   Japan ................................ 5-260683

[51] Int. Cl.⁶ ................................................ G11B 07/09
[52] U.S. Cl. ................ 369/44.280; 369/44.370
[58] Field of Search ................. 369/44.28, 44.79, 369/32, 44.34, 44.34, 44.38, 44.27; 250/201.5

[56]   References Cited

U.S. PATENT DOCUMENTS

| | | | |
|---|---|---|---|
| 4,677,602 | 6/1987 | Okano et al. | 369/44.28 |
| 4,825,431 | 4/1989 | Kimura et al. | 369/50 |

FOREIGN PATENT DOCUMENTS

| | | |
|---|---|---|
| 59-185044 | 10/1984 | Japan . |
| 1-60823 | 3/1989 | Japan . |
| 1-178131 | 7/1989 | Japan . |
| 5-12677 | 1/1993 | Japan . |
| 6-10879 | 2/1994 | Japan . |

Primary Examiner—W. R. Young
Assistant Examiner—Thang V. Tran
Attorney, Agent, or Firm—David G. Conlin; Brain L. Michaelis

[57]   ABSTRACT

A multi-beam recording-reproduction apparatus, which is provided with: a track-crossing signal generation section for releasing a track-crossing signal in response to a reflected light beam derived from a predetermined one of a plurality of light beams that have been projected onto an optical disk from an optical head and that are shifted in the same direction at the same time; and a track-counting circuit for releasing a track-count value in accordance with the track-crossing signal, characterized in that an access control section makes a positioning of the optical head in accordance with the track-count value. This arrangement makes it possible to provide a track-counting operation by installing only one track-crossing signal generation section as well as only one track-counting circuit for use in counting tracks. In other words, the track-counting operation is available by using a simpler construction. As a result, it becomes possible to improve positioning accuracy of the optical head, to reduce the number of parts for constituting the apparatus, and to cut costs of the apparatus.

12 Claims, 12 Drawing Sheets

MULTI-BEAM RECORDING-REPRODUCTION APPARATUS WITH IMPROVED POSITIONING ACCURACY AND TRACK COUNTING

FIELD OF THE INVENTION

The present invention relates to a multi-beam recording-reproduction apparatus for recording and reproducing information by projecting a plurality of light beams onto an optical recording medium, and more particularly concerns a track-accessing operation for shifting an optical head to a target track.

BACKGROUND OF THE INVENTION

Conventionally, in a device for driving an optical recording medium while using a single beam, a track-crossing signal generation means generates a track-crossing signal by using reflected light from the optical recording medium. This signal is inputted to a track-counting means where the track-crossing signal is counted, and in accordance with this counted value, an optical head is shifted to a target track (see Japanese Laid-Open Patent Publication No. 60823/1989 (Tokukaishou 64-60823), Japanese Laid-Open Patent Publication No. 12677/1993 (Tokukaihei 5-12677)).

Moreover, Japanese Laid-Open Patent Publication No. 185044/1984 (Tokukaishou 59-185044) has disclosed an arrangement wherein one of the multi-beams is used for the tracking operation.

SUMMARY OF THE INVENTION

The objective of the present invention is to provide a multi-beam recording-reproduction apparatus which improves positioning accuracy of an optical head by carrying out the counting operation of tracks.

In order to achieve the above-mentioned objective, the multi-beam recording-reproduction apparatus of the present invention is provided with: an optical head having at least one light source for projecting a plurality of light beams onto a recording medium, the optical head being allowed to shift relatively with respect to the recording medium; light-receiving means for receiving reflected light beams or transmitted light beams respectively and releasing electric signals, the reflected light beams or the transmitted light beams being derived from the light beams from the recording medium; a track-crossing signal generation means for releasing a track-crossing signal in accordance with the electric signal released from the predetermined one of the light-receiving means; a track-counting means for releasing a track-count value that represents the number of tracks the light beams have crossed over, in accordance with the track-crossing signal; and an access control means for positioning the optical head in accordance with the track-count value.

In the above-mentioned arrangement, when the optical head, which has at least one light source for projecting a plurality of light beams, is shifted, the projected light beams are all shifted in the same direction at the same time; therefore, all the light beams cross the same number of tracks. For this reason, it is sufficient to carry out a track-counting operation with respect to only one reflected light beam derived from one of the light beams; this makes it possible to carry out the track-counting operation by using a simpler arrangement. As a result, it becomes possible to reduce the number of parts to constitute the apparatus as well as cutting costs of the apparatus.

Further, when the arrangement is made so that the predetermined one of the light-receiving means receives a reflected light beam derived from the endmost one of a bundle of light beams that have been projected from the light source, the track-crossing signal generation means releases the track-crossing signal in accordance with the reflected light beam derived from the endmost one of the light beams; therefore, the output electric signal is hardly susceptible to crosstalk caused by the adjacent light beams. This makes it possible to obtain a more accurate track-count value and to improve the positioning accuracy of the optical head.

Moreover, another arrangement may be adopted, wherein a light-source control means for controlling the light source is further provided so that, when the optical head makes a seeking operation toward a target track, only one light beam whose reflected light beam is to be received by the predetermined one of the light receiving means is projected. With this arrangement, since only one light beam for use in the track-counting operation is projected during the seeking operation, the track-counting operation is carried out without being adversely affected by crosstalk from the other light beams. As a result, it becomes possible to obtain a more accurate track-count value and to improve the positioning accuracy of the optical head.

Furthermore, still another arrangement may be adopted, wherein the access control means further includes: a calculating means for calculating the number of tracks which the optical head has to cross over to reach a target track; and a driving means for driving the optical head until the counted number of tracks comes to equal the track-count value that is released from the track-counting means while the optical head is being driven. With this arrangement, the positioning operation is made based on a more accurate track-count value, thereby further improving the positioning accuracy of the optical head.

Further, if a dc-current eliminating means, which eliminates the dc component of the electric signal to leave only the ac component and inputs the resulting ac signal to the information-signal generation means, is further added to the arrangement, it becomes possible to further simplify the circuit configuration as well as reducing the power consumption.

Moreover, still another arrangement may be adopted, wherein at least one information-signal generation means, which is installed for the respective light-receiving means other than the predetermined one of the light-receiving means and releases an information signal in accordance with the electric signals released from the respective light-receiving means, is further provided so that one of the light beams is exclusively used for counting tracks, and the predetermined one of the light-receiving means, the track-crossing signal generation means, and the track-counting means are constituted of circuits for processing frequencies with lower bands, compared with those of the other light-receiving means and the information-signal generation means. This arrangement makes it possible to further simplify the circuit configuration as well as reducing power consumption.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
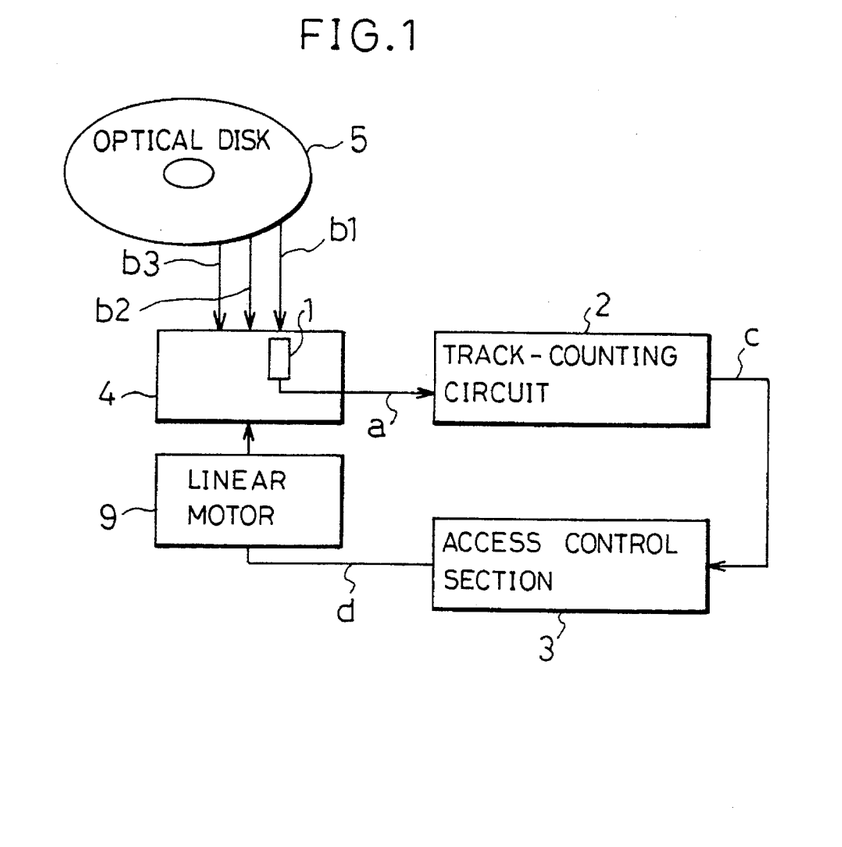
FIG. 1 is a block diagram showing a schematic construction of a multi-beam recording-reproduction apparatus in one embodiment of the present invention.
Figure 9:
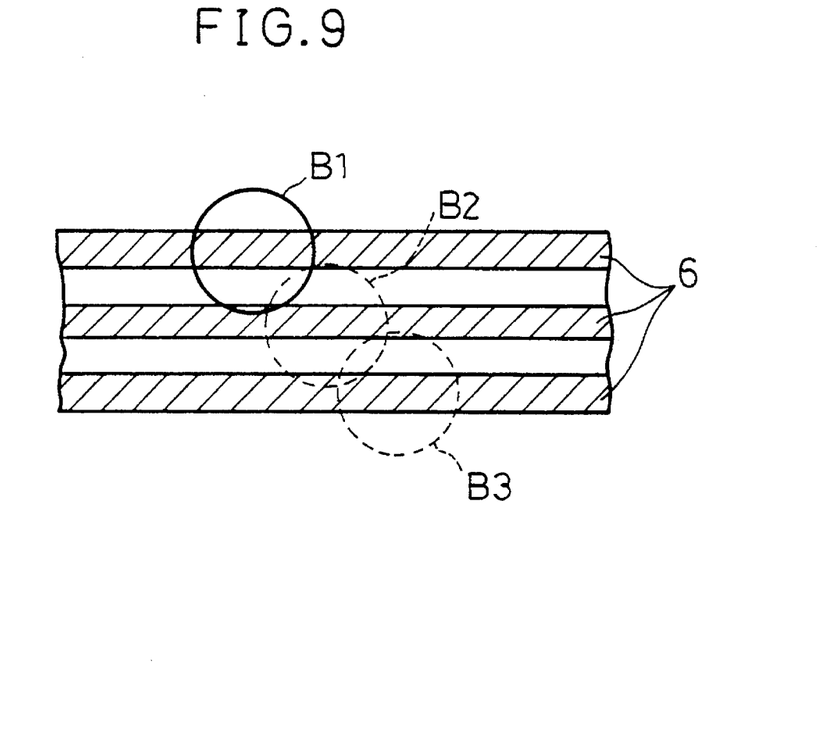
FIG. 9 is a schematic illustration showing crosstalk of light beams on the optical disk.
Figure 10:
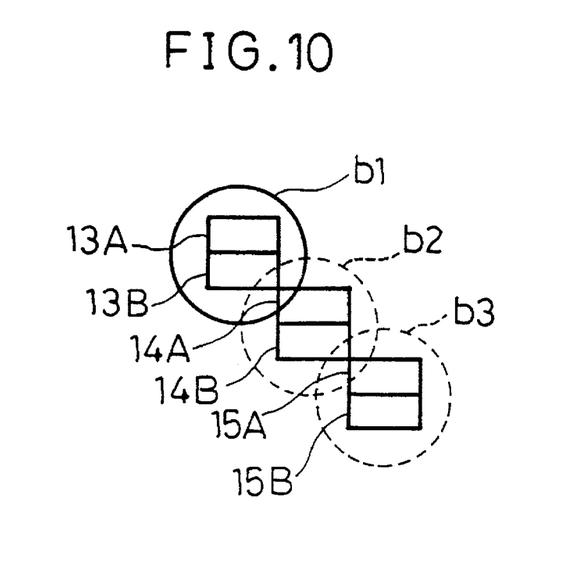
FIG. 10 is a schematic illustration showing crosstalk of reflected light beams projected onto photodetectors inside the optical head.

Referring to FIGS. 1 though 6 as well as FIGS. 9 through 11, the following description will discuss the first embodiment of the present invention.

As illustrated in FIG. 1, a multi-beam recording-reproduction apparatus of the present invention is provided with: an optical head 4 having a track-crossing signal generation section 1 installed therein; a track-counting circuit 2; and an access control section 3. In this apparatus, a plurality of light beams are projected onto an optical disk 5 (recording medium) from the optical head 4, and only the reflected light beam b1, one of the reflected light beams b1, b2, and b3 derived from the projected light beams, is directed to the track-crossing signal generation section 1 (track-crossing signal generation means). The track-crossing signal generation section 1 is constituted of, for example, two-part photodetectors, addition circuits, or subtraction circuits, which will be described later.

The track-crossing signal generation section 1 releases a track-crossing signal a to the track-counting circuit 2 (track-counting means) in response to the reflected light beam b1. The track-counting circuit 2 releases a track-count value c to the access control section 3 (access control means) in accordance with the track-crossing signal a. The access control section 3 releases an access signal d to a linear motor 9 for driving the optical head 4 in accordance with the track-count value c. The linear motor 9 drives the optical head 4 in accordance with the access signal d so as to shift it toward a target track.

Figure 2:
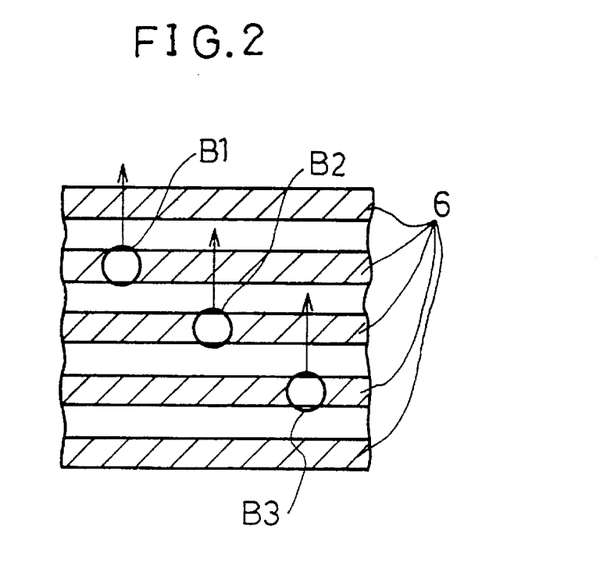
FIG. 2 is an explanatory drawing that shows how light beams, which are projected onto an optical disk, are shifted.

FIG. 2 shows how a plurality of light beams, which are being projected onto the optical disk 5, move across tracks 6 on the optical disk 5. As shown in FIG. 2, the optical head 4 is arranged so that as one light beam B1 is shifted across the tracks 6 in a direction indicated by an arrow in the drawing, the other light beams B2 and B3 are also shifted across the tracks 6 in the same manner. Accordingly, the number of tracks that is calculated based on the reflected light beam b1 derived from the light beam B1 is equal to the number of tracks that is calculated based on each of the reflected light beam b2 and b3 respectively derived from the light beams B2 and B3. In other words, it is only necessary to calculate the track-count value c based on only the reflected light beam b1: the calculating operations for the number of tracks that are derived from the other reflected light beams may be omitted.

Figure 3:
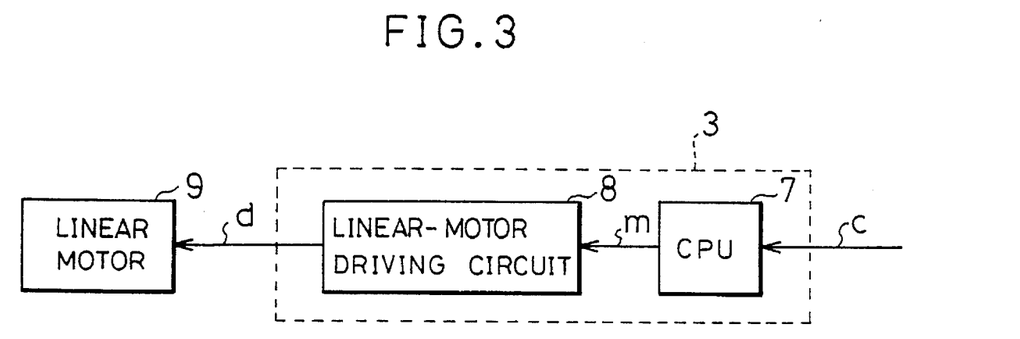
FIG. 3 is a block diagram showing a construction of an access control section in the above-mentioned apparatus.

Referring to FIG. 3, the following description will discuss the access control section 3 in detail.

The access control section 3 is constituted of a CPU 7 (counting means) and a linear-motor driving circuit 8 (driving means).

The CPU 7 releases a linear-motor control signal m to the linear-motor driving circuit 8 in accordance with the track-count value c released from the track-counting circuit 2. The linear-motor driving circuit 8 releases an access signal d to a linear motor 9 that functions as a driving means for the optical head 4 in accordance with the linear motor control signal m.

Figure 5:
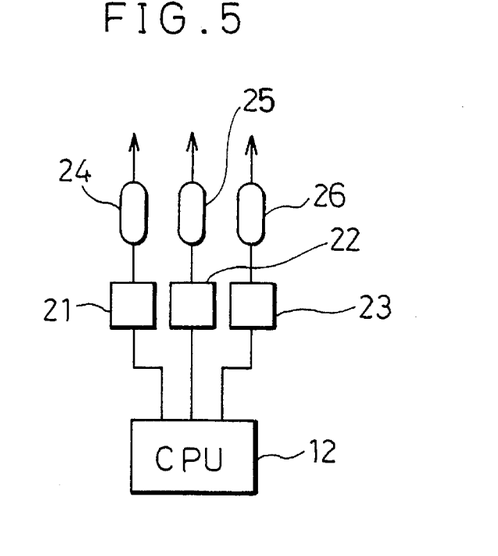
FIG. 5 is an explanatory drawing that shows one example of a construction for projecting light beams that is installed inside an optical head in the above-mentioned apparatus.
Figure 6:
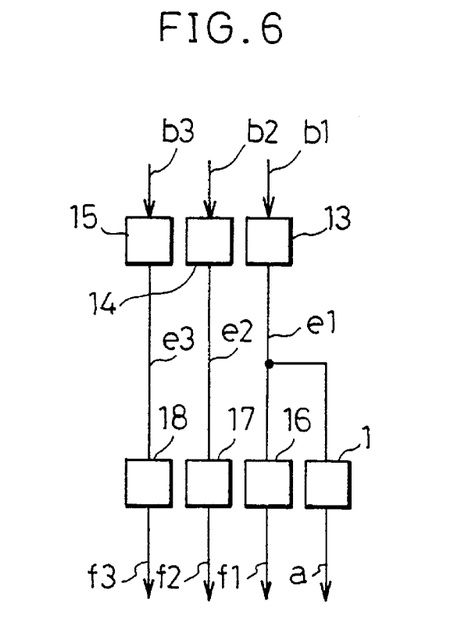
FIG. 6 is an explanatory drawing that shows one example of a construction for receiving and processing reflected light beams that is installed inside the optical head.

Referring to FIGS. 5 and 6, the following description will discuss the optical head 4 in detail.

FIG. 5 shows a construction that is installed inside the optical head 4 in order to project light beams onto the optical disk 5. As illustrated in FIG. 5, a CPU 12 (light-source control means), laser driving circuits 21, 22 and 23, and semiconductor lasers 24, 25 and 26 (light sources) are installed inside the optical head 4. The laser driving circuits 21, 22 and 23 are driven in response to instruction signals released from the CPU 12, thereby releasing driving currents to the semiconductor lasers 24, 25 and 26. The semiconductor lasers 24, 25 and 26 project light beams onto the optical disk 5 in accordance with these driving currents.

Moreover, FIG. 6 shows a construction that is installed inside the optical head 4 in order to receive reflected light beams that are derived from the light beams projected onto the optical disk 5 from the semiconductors 24, 25 and 26. As illustrated in FIG. 6, photodetectors 13, 14 and 15 (light-receiving means) and information-signal generation circuits 16, 17 and 18 (information-signal generation means) are also installed inside the optical head 4. The information-signal generation circuits 16, 17 and 18 are constituted of, for example, differential amplifiers for making a differential detection in the magneto-optical reproducing optical system, servo-use addition amplifiers for making addition in a two-part or four-part photodetector, and other devices.

The photodetectors 13, 14 and 15 receive the respective reflected light beams b1, b2 and b3, convert them into electric signals e1, e2 and e3, and release these signals to the information-signal generation circuits 16, 17 and 18. In this case, only the electric signal e1 is also inputted to the track-crossing signal generation section 1. The information-signal generation circuits 16, 17 and 18 release information signals f1, f2 and f3 to a reproduction circuit, not shown, in accordance with the electric signals e1, e2 and e3. In the reproduction circuit, the information signals are converted into digital signals of "0" and "1" by a peak-detection circuit and an amplitude-detection circuit, and are reproduced. In addition, the track-crossing signal generation section 1 releases the track-crossing signal a to the track-counting circuit 2 shown in FIG. 1 in accordance with the electric signal e1. Thus, a track-counting operation is carried out in the track-counting circuit 2.

Additionally, in the present embodiment, the track-counting operation is made not based on the reflected light beam b2 derived from the light beam located in the middle of the multi-beams, but based on the reflected light beam b1 derived from the light beam located at the end thereof; this arrangement is made so as to prevent erroneous track-counting due to crosstalk caused by the other reflected light beams.

In other words, when the gaps between the multi-beams are set closely, crosstalk occurs due to overlapped edge portions between the light beams on the optical disk 5 as shown in FIG. 9. In the same manner as this, crosstalk occurs also on the photodetectors 13, 14 and 15 due to the reflected light beams. More specifically, it is desirable to allow only the reflected light beam b1 to enter the photodetector 13, allow only the reflected light beam b2 to enter the photodetector 14, and allow only the reflected light beam b3 to enter the photodetector 15. However, the reflected light beams b1, b2 and b3 have respective expansions, and their edge portions are respectively directed to other photodetectors as shown in FIG. 10, thereby causing crosstalk. This raises a possibility of erroneous track-counting.

As shown in FIG. 10, the photodetectors 13, 14 and 15 are two-part photodetectors that respectively have light-receiving surfaces 13A and 13B, light-receiving surfaces 14A and 14B, and light-receiving surfaces 15A and 15B.

Figure 11A:
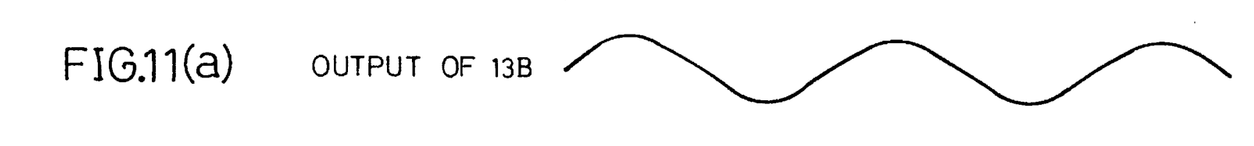
FIGS. 11(a) through 11(e) are explanatory drawings that show signals released from the photodetectors.
Figure 11B:
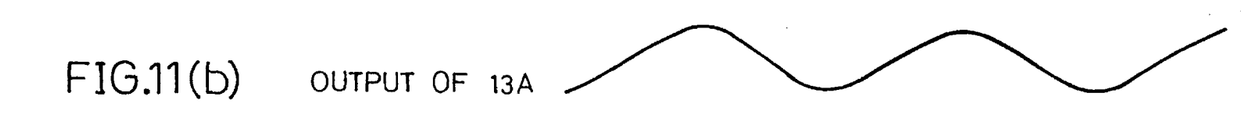
Figures 11C, 11D:
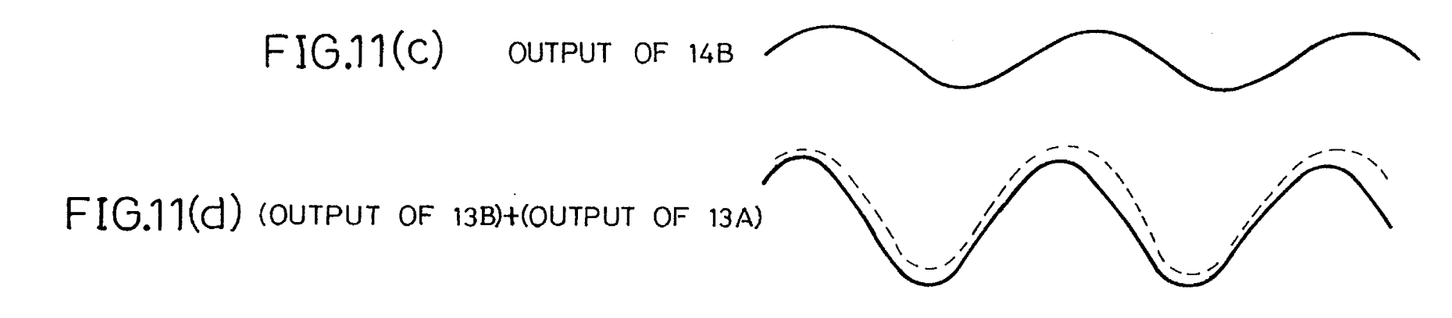
Figure 11E:
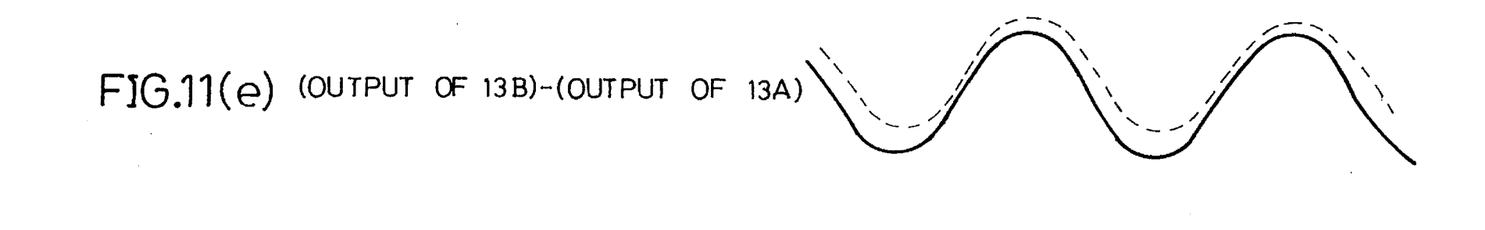

In this arrangement, the light-receiving surface 13B results in an output shown in FIG. 11(a), and the light-receiving surface 13A results in an output shown in FIG. 11(b). The track-counting operation is carried out based on a sum signal (indicated by a dotted line in FIG. 11(d)) or a difference signal (indicated by a dotted line in FIG. 11(e)) between the outputs of the light-receiving surfaces 13A and 13B. However, in an actual operation, since the light-receiving surface 13A is partially irradiated by the adjacent reflected light beam b2 as shown in FIG. 10, the sum signal and the difference signal form greater outputs including errors caused by crosstalk, compared with optimum signals indicated by solid lines shown in FIGS. 11(d) and 11(e). This raises a possibility of erroneous track-counting.

In addition, as is clearly shown by FIG. 10, the photodetector 14 is subjected to crosstalk due to the reflected light beam b1 at its light-receiving surface 14A, and is also subjected to the reflected light beam b3 at its light-receiving surface 14B. For this reason, the outputs of the photodetector 14 include more errors due to crosstalk, compared with the outputs of the photodetector 13 or the photodetector 15; therefore, the photodetector 14 has a higher possibility of erroneous track-counting. Consequently, for use in track counting, it is desirable to utilize a reflected light beam that is derived from a light beam located at the end of the multi-beams in order to reduce crosstalk.

Moreover, in order to further reduce crosstalk, the laser driving circuits 21 and 22 are turned off during the track-counting operation (during the seeking operation) while only the laser driving circuit 23 is turned on, through a control operation provided by a CPU 12 shown in FIG. 5; this allows only one light beam used for obtaining the reflected light beam b1 to be directed to the optical disk 5, thereby making it possible to eliminate crosstalk. After completion of the seeking operation, when information is recorded or reproduced, the laser driving circuits 21 and 22 are turned on again, thereby enabling a high-speed information recording or reproducing operation by the use of the multi-beams.

Figure 4:
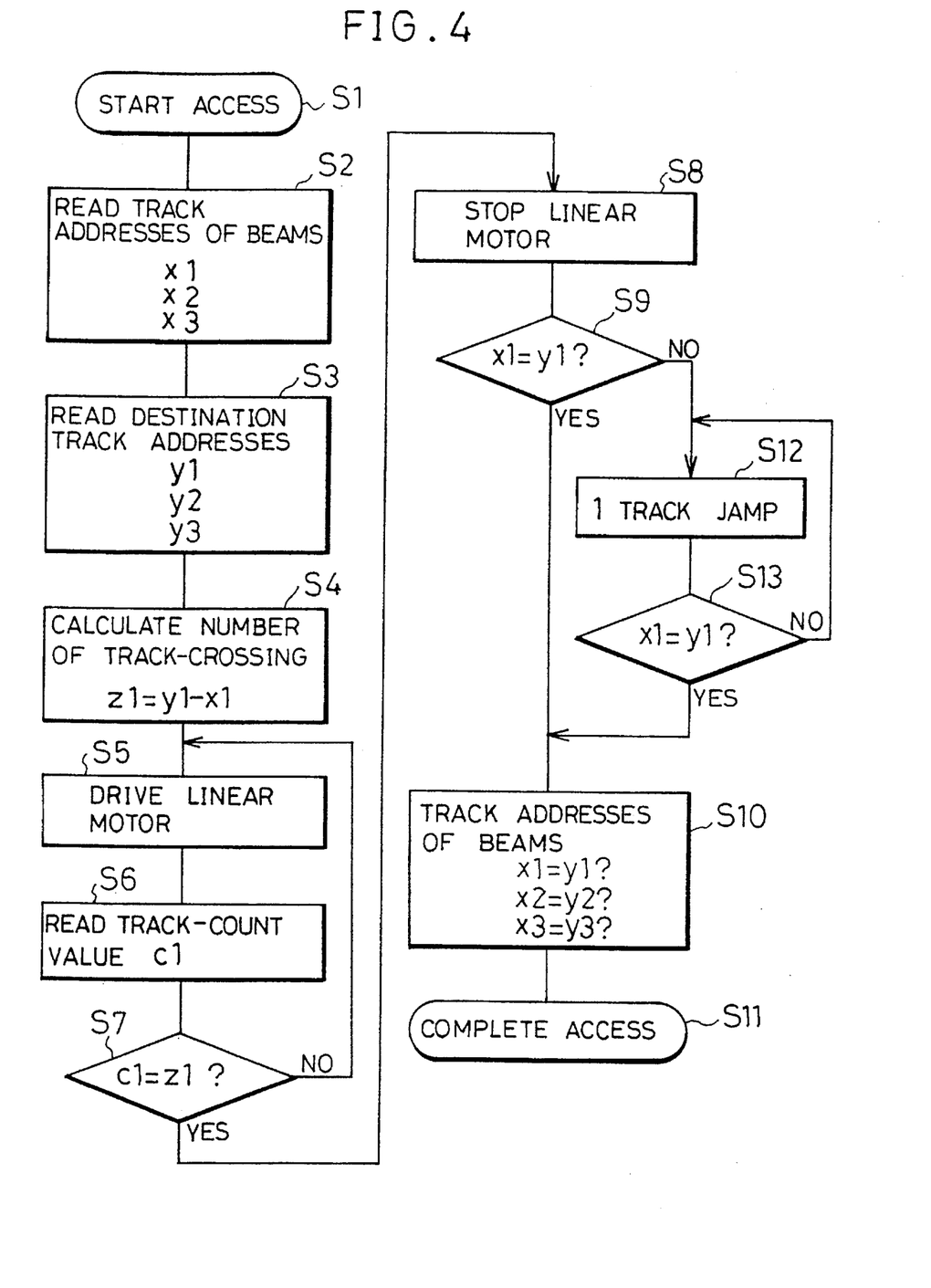
FIG. 4 is a flow chart showing a sequence of accessing processes in the above-mentioned apparatus.

Referring to a flow chart of FIG. 4, the following description will discuss an access control operation that is carried out by the CPU 7 in the access control section 3.

When the optical head 4 starts making an access on the optical disk 5 (S1), track addresses x1, x2 and x3, which indicate tracks that are currently irradiated by respective light beams, are read out in accordance with the reflected light beams b1, b2 and b3 (S2). Successively, destination track addresses y1, y2 and y3 to be accessed next are read out respectively (S3). Then, the track-crossing number z1, which indicates the number of tracks to be crossed by each light beam, is calculated based on an equation: $z1=y1-x1$ (S4). While the linear motor 9 is driven (S5), a track-count value c1 is inputted to the access control section 3 from the track-counting circuit 2 in accordance with the reflected light beam b1 (S6), and the track-count value c1 is compared with the track-crossing number z1 (S7). As a result of the comparison, if the two values do not match, the sequence returns to S5; and if the two values match, the driving of the linear motor 9 is stopped (S8).

Next, upon completion of S8, the track address x1 of a track which is currently irradiated by the light beam is compared with the destination track address y1 (S9). As a result of the comparison, if the two values do not match, one track-jumping operation is made (S12), and the same comparison as was made at S9 is again carried out (S13). If the comparison at S9 does not make a match, either, the sequence returns to S12, and the processes of S12 and S13 are repeated until a match is made.

As described above, the track address x1, which is currently irradiated by the light beam, is made coincident with the destination track address y1, and finally it is confirmed whether or not the track addresses x1, x2 and x3 respectively coincide with the destination track addresses y1, y2 and y3 (S10), based on the respective reflected light beams, thereby completing the accessing operation (S11).

As described above, the multi-beam recording-reproduction apparatus of the present invention provides an accurate track-counting operation without being adversely affected by crosstalk, by utilizing one light beam located at the end of a plurality of light beams so as to conduct a track-counting operation. As a result, it becomes possible to improve positioning accuracy of the optical head. Further, it is sufficient to install a circuit for making a track-counting operation with respect to only one of the light beams; this makes it possible to reduce the number of parts of the apparatus and realize the apparatus by using a simpler construction.

Moreover, in the case of recording or reproducing information by using an optical disk wherein a guiding groove for tracking control is provided for each set of tracks, if the track-counting operation is carried out by using all the light beams, the other light beams, except for one light beam located at the end thereof, do not allowed to count the last track forever; this makes it impossible to judge whether this is due to over counting or insufficient counting, thereby causing an improper positioning of the optical head. In contrast, in accordance with the multi-beam recording-reproduction apparatus of the present invention, since one light beam located at the end of a plurality of light beams is utilized for the track-counting operation, it is possible to provide an accurate track-counting operation even in the case of using such an optical disk as described above, thereby enabling an appropriate positioning of the optical head.

Second Embodiment

Figure 7:
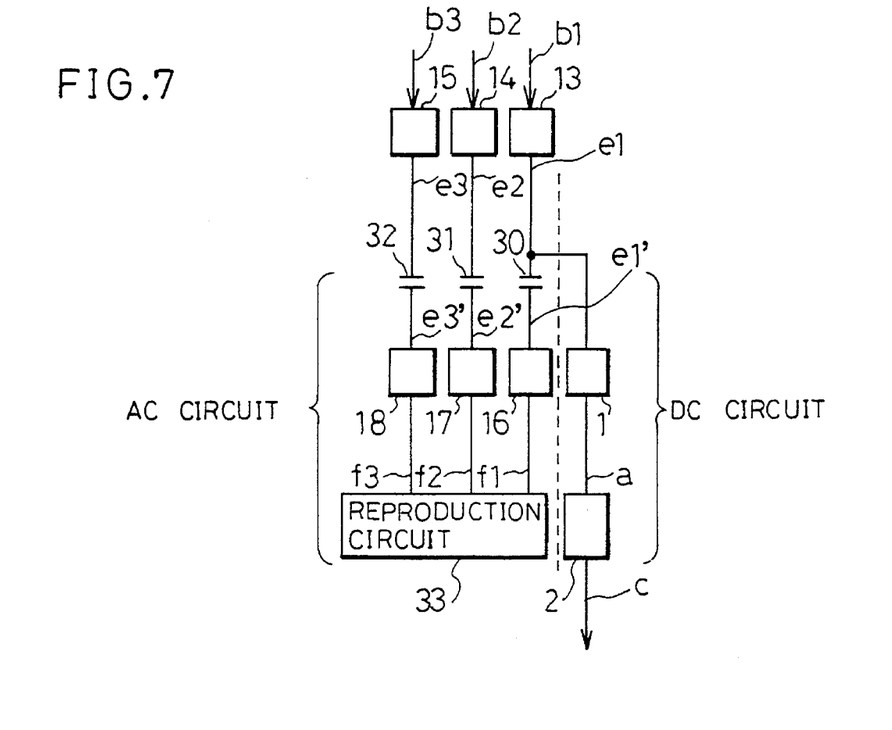
FIG. 7 is an explanatory drawing that shows another example of the construction for receiving and processing reflected light beams that is installed inside the optical head.
Figure 12:
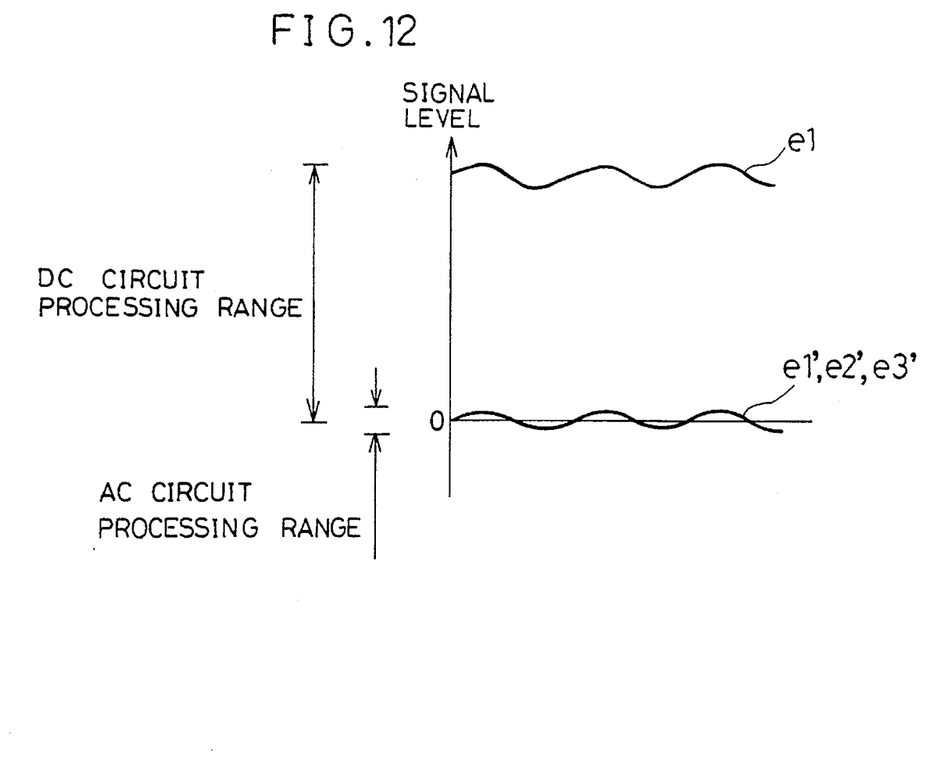
FIG. 12 is a graph showing signal levels of a track-crossing signal containing the dc component and an information signal not containing the dc component.

Referring to FIGS. 6, 7 and 12, the following description will discuss another embodiment of the present invention. Here, for convenience of explanation, those members that have the same functions and that are described in the first embodiment are indicated by the same reference numerals and the description thereof is omitted. The same can be said in still another embodiments described later.

Information signals, which require high-density recording, are subjected to a coding process and an dc-component eliminating process so as not to give adverse effects on the information reproducing operation. Therefore, it is possible to record and reproduce those signals as signals having only the ac component. However, the track-crossing signal a, which is released from the track-crossing signal generation section 1, needs to be processed as a signal having both the dc component and ac component in response to the behaviors of the optical head 4, such as a stopped state, a low-speed track-crossing state, and a high-speed track-crossing state.

Moreover, in general, since an ac circuit has a narrower range of signal level compared with an dc circuit, it enables a simplified circuit construction as well as a reduction in power consumption. Therefore, it is more beneficial to process information signals in an ac circuit. Here, it is necessary to process the track-crossing signal a in an dc circuit as described above. In other words, in order to simplify the circuit construction and reduce the power consumption, it is necessary to separate a processing circuit for the track-crossing signal from that for the information signal so that the information signal is processed in the ac circuit while the track-crossing signal is processed in the dc circuit.

As illustrated in FIG. 7, in the multi-beam recording-reproduction apparatus of the present embodiment, capacitors 30, 31 and 32 (dc-component eliminating means) are respectively disposed between the photodetectors 13, 14, 15 and the information-signal generation circuits 16, 17, 18 inside the optical head, which have been explained with reference to FIG. 6 in the first embodiment. Here, no capacitor is disposed between the photodetector 15 and the track-crossing signal generation section 1. These capacitors 30, 31 and 32 eliminate the dc component of the electric signals e1, e2 and e3 that have been released from the photodetectors 13, 14 and 15 in accordance with the reflected light beams b1, b2 and b3, thereby converting them into electric signals e1', e2' and e3' containing only the ac component In response to these electric signals e1', e2' and e3' the information signal generation circuits 16, 17 and 18 release information signals f1, f2 and f3 to the reproduction circuit 33, thereby allowing information to be reproduced. Here, the electric signal e1 is also inputted to the track-crossing signal generation section 1, where the signal is processed as a signal containing the dc component, and the resulting track-crossing signal a is released to the track-counting circuit 2, thereby enabling the track-counting operation.

By disposing the capacitors 30, 31 and 32 as described above, it becomes possible to process the information signal in an ac circuit for processing only the ac component while processing the track-crossing signal in a dc circuit for processing both the ac component and dc component.

FIG. 12 is a graph that shows the levels of the signals to be processed in the above-mentioned dc circuit and ac circuit for comparative purposes. The electric signals e1', e2' and e3', which have only the ac component, vary on both sides of the zero level, while the electric signal e1 has a greater signal level compared with the electric signals e1', e2' and e3', because it contains the dc component. In this case, in comparison with a processing range of 100–200 mV of the ac circuit, the processing range of the dc circuit is 1–2 V, which is approximately 10 times as high as the former value. Therefore, with this arrangement wherein the information signal is processed in the ac circuit through the capacitors while only the track-crossing signal is processed in the dc circuit, it becomes possible to simplify the circuit construction as well as realizing the power saving to a great extent.

Third Embodiment

Referring to FIGS. 8, and 12 through 14, the following description will discuss still another embodiment of the present invention.

First, referring to FIG. 14, an explanation will be given on the difference between the track-crossing signal frequency band in the case when the light beam B1 crosses a track in the direction orthogonal to the track and the information signal frequency band in the case when a light beam scans a track in the following direction.

Figure 13:
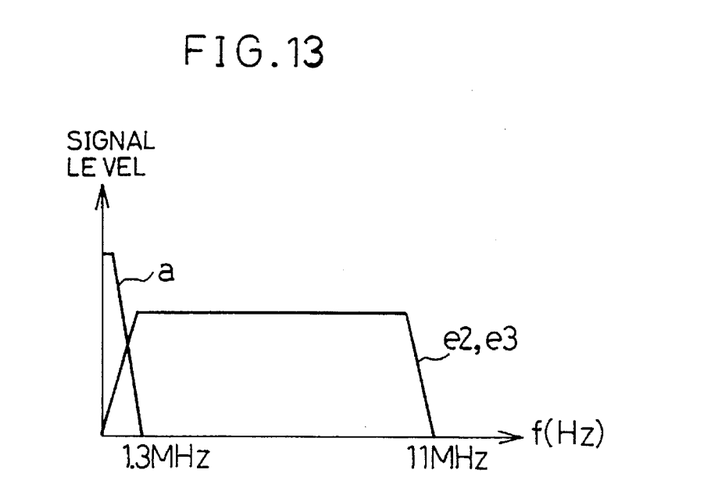
FIG. 13 is a graph showing frequency bands of the track-crossing signal and the information signal.
Figure 14:
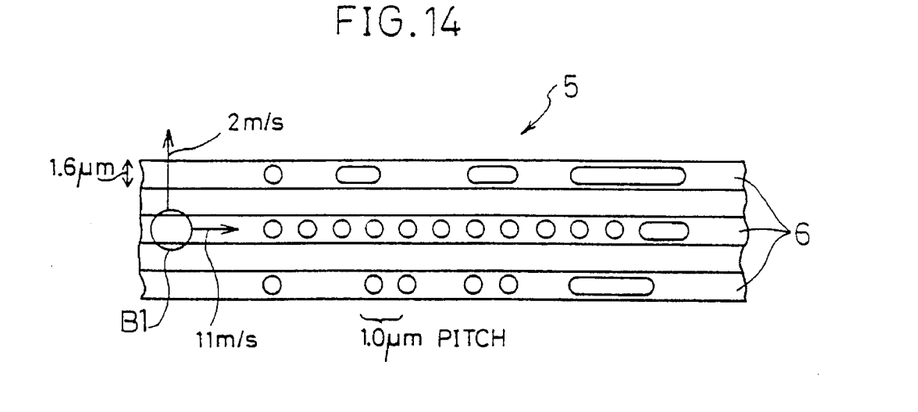
FIG. 14 is an explanatory drawing that shows how the light beam makes a scanning on the optical disk.

Assuming that the maximum speed at which the light beam crosses the tracks 6 of the optical disk 5 in the direction orthogonal thereto is 2 m/s with a track pitch of 1.6 µm as shown in FIG. 14, the maximum frequency of the track-crossing signal a (more specifically, signals shown in FIGS. 11(a) and 11(b) respectively) is approximately 1.3 MHz as shown in FIG. 13. On the other hand, assuming that the linear velocity at which the light beam scans a track in the following direction is 11 m/s with the shortest recording marks having a repetitive pitch of 1 µm, the maximum frequency of the information signals e2 and e3 is 11 MHz, as is also shown in FIG. 13. As is clearly described above, the information signals e2 and e3, which do not contain the dc component, have a frequency band that is virtually 10 times as high as the frequency band of the track-crossing signal a which contains the dc component; therefore, it is required for the photodetectors and the reproduction circuit that process the information signal to have characteristics to deal with wide frequency bands.

Figure 8:
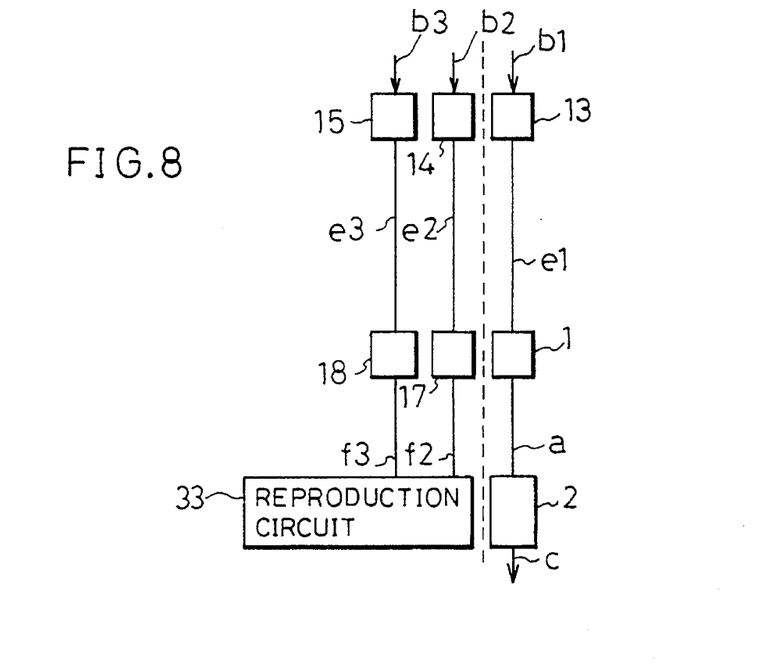
FIG. 8 is an explanatory drawing that shows still another example of the construction for receiving and processing reflected light beams that is installed inside the optical head.

Thus, as illustrated in FIG. 8, by adopting an arrangement wherein the reflected light beam b1 is exclusively used for track counting while the reflected light beams b2 and b3 are exclusively used for information reproduction, it becomes possible to reduce the frequency bands that are processed by the photodetector 13, the track-crossing signal generation section 1 and the track-counting circuit 2. In other words, the circuits for processing the information signals, that is, the photodetectors 14 and 15, the information-signal generation circuits 17 and 18, and the reproduction circuit 33 are constituted of circuits that are suitable for high bands, while the other circuits are constituted of circuits that are suitable for comparatively low bands. This arrangement makes it possible to simplify the circuit construction, as well as making it possible to cut power consumption by the use of low frequencies.

Fourth Embodiment

Figure 15:
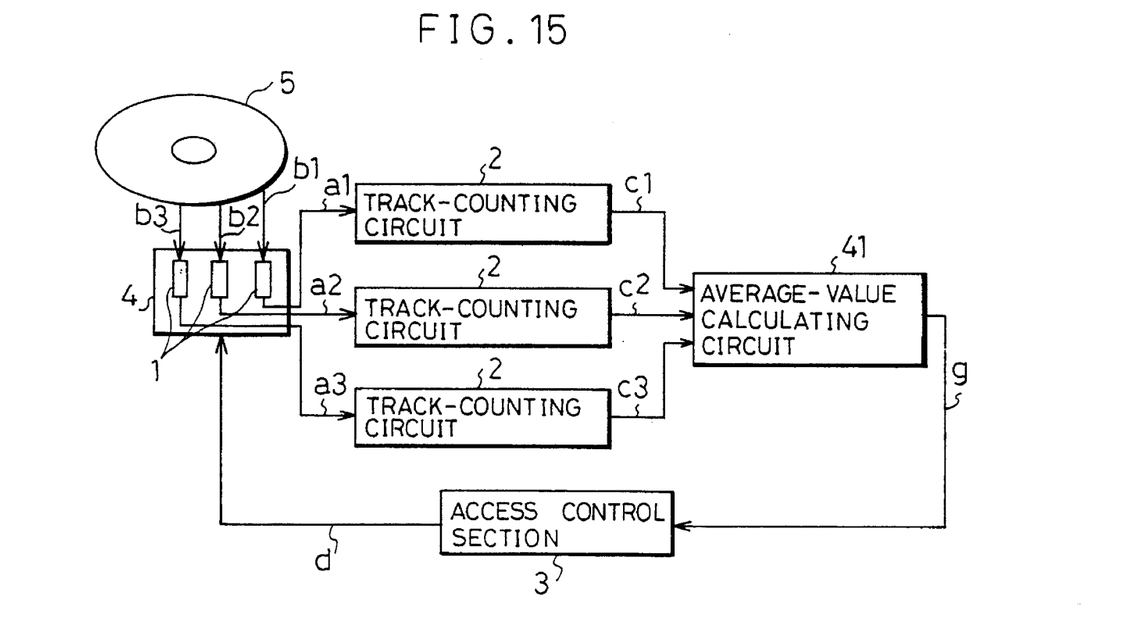
FIG. 15 is a block diagram showing a schematic construction of a multi-beam recording-reproduction apparatus in another embodiment of the present invention.
Figure 16:
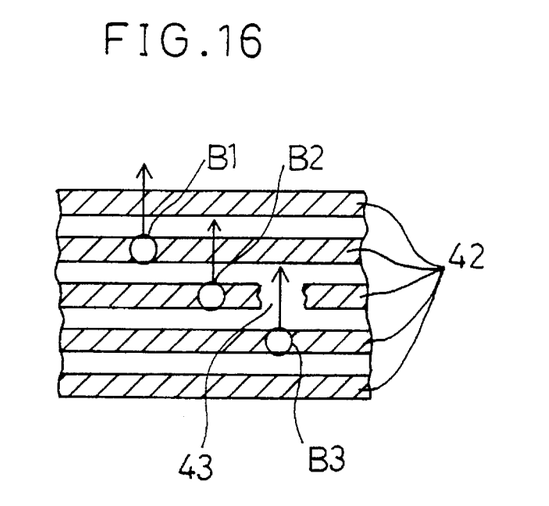
FIG. 16 is an explanatory drawing that shows how light beams are shifted when they are projected onto an optical disk that contains a defective track.
Figure 17:
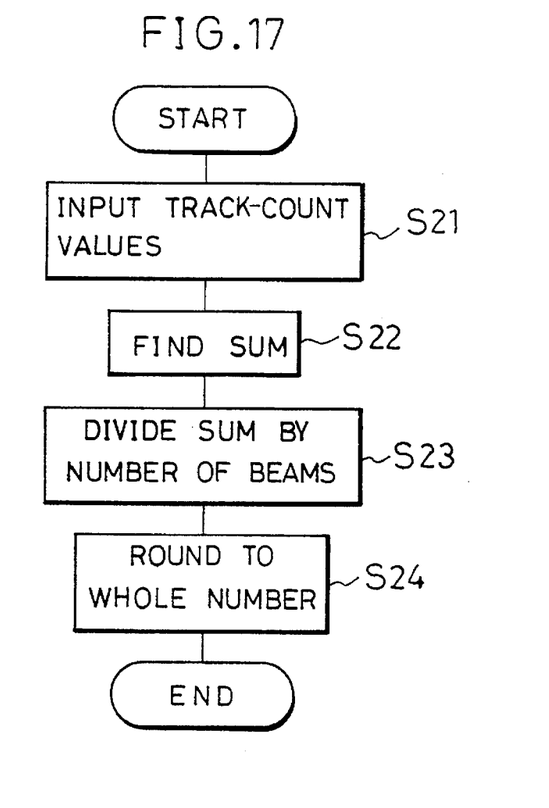
FIG. 17 is a flow chart that shows a sequence of processes for obtaining an average value of track-count values that are counted using multi-beams in the above-mentioned apparatus.

Referring to FIGS. 15 through 17, the following description will discuss still another embodiment of the present invention.

As illustrated in FIG. 15, in a multi-beam recording-reproduction apparatus of the present embodiment, three track-crossing signal generation sections 1, which are described in the first embodiments with reference to FIG. 1, are installed inside the optical head 4 in order to deal with the respective reflected light beams b1, b2 and b3 derived from light beams projected onto the optical disk 5. The track-crossing signal generation section 1 may be constituted of a two-part photodetector, a subtraction circuit and other devices.

Track-crossing signals a1, a2 and a3, which are released from the track-crossing signal generation sections 1 in accordance the reflected light beams b1, b2 and b3, are inputted to the track-counting circuits 2 respectively. Then, the track-counting circuits 2 respectively release track-count values c1, c2 and c3. The track-count values c1, c2 and c3 are inputted to an average-value calculating circuit 41 that is constituted of, for example, a CPU, the resulting average value g is released to the access control section 3. The access control section 3 releases an access signal d to the linear motor for driving the optical head 4, not shown, based on the average value g, thereby allowing the optical head 4 to move toward a target track.

As described above, the average-value calculating circuit 41 finds the average of the track-count values derived from the multi-beams; therefore, it becomes possible to obtain stable track-count values even if there is noise in reproduced signals or a defective portion in tracks.

As was explained with reference to FIG. 2 in the first embodiment, when the light beams cross the tracks, the resulting reflected light beams b1, b2 and b3 generate the same number of track-crossing signals. However, for example as illustrated in FIG. 16, if there is a defective portion 43 in the tracks 42, only the reflected light beam derived from the light beam B3 fails to generate the same number of track-crossing signals. In this case, a servo signal, such as disclosed in the aforementioned Japanese Laid-Open Patent Publication No. 178131/1989 (Tokukaihei 1-178131), is not susceptible to the influence of the defective track, because it has a frequency band that is much higher than the frequency band of the track-crossing signal. However, the track-crossing signal is susceptible to the influence of the defective track, and the track-count value c3 for the reflected light beam b3 is erroneously counted. This type of erroneous calculation might occur not only due to the defective portion 43, but also due to noise in reproduced signals or RF reproduced signals. For this reason, the erroneous calculation is corrected by finding the average of the track-count values derived from the three reflected beams and rounding the average value; thus, it is possible to obtain an accurate counted average value g.

Referring to a flow chart in FIG. 17, an explanation will be given on the operation of the average-value calculating circuit 41. When an averaging operation is started after the track-count values c1, c2 and c3 have been inputted thereto (S21), the sum of the track-count values c1, c2 and c3 is found (S22). Next, the sum is divided by the number of the light beams (S23). In other words, (c1+c2+c3)/3 is calculated. Then, the decimal at the first place is rounded to form the nearest whole number (S24). Thus, the counted average value g is found as a whole number.

Fifth Embodiment

Figure 18:
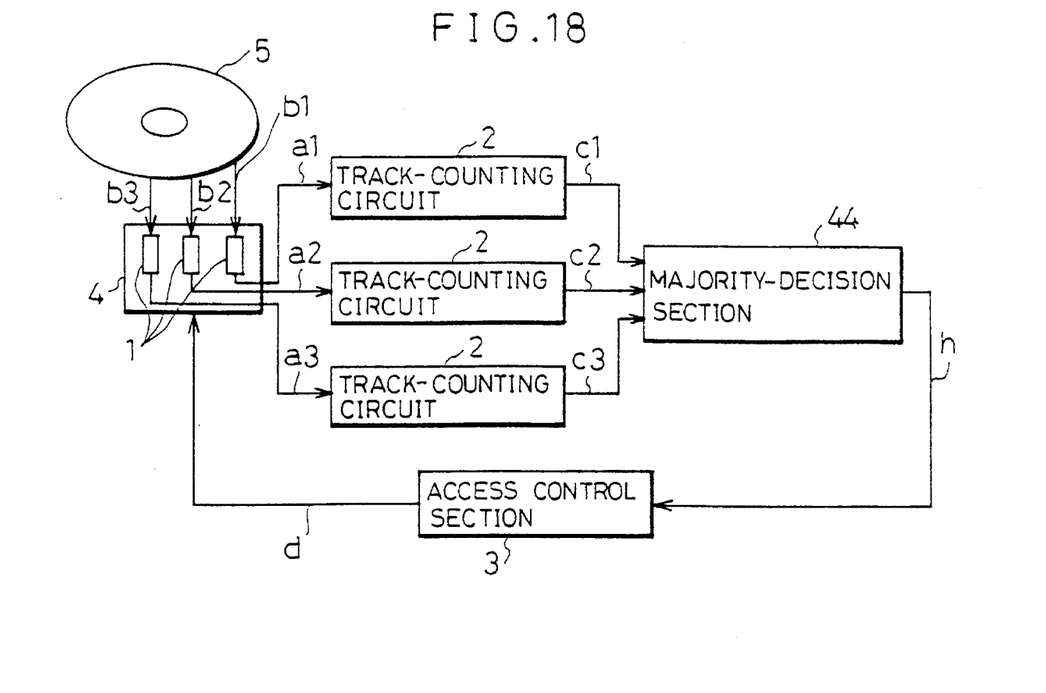
FIG. 18 is a block diagram showing a schematic construction of a multi-beam recording-reproduction apparatus in still another embodiment of the present invention.
Figure 19:
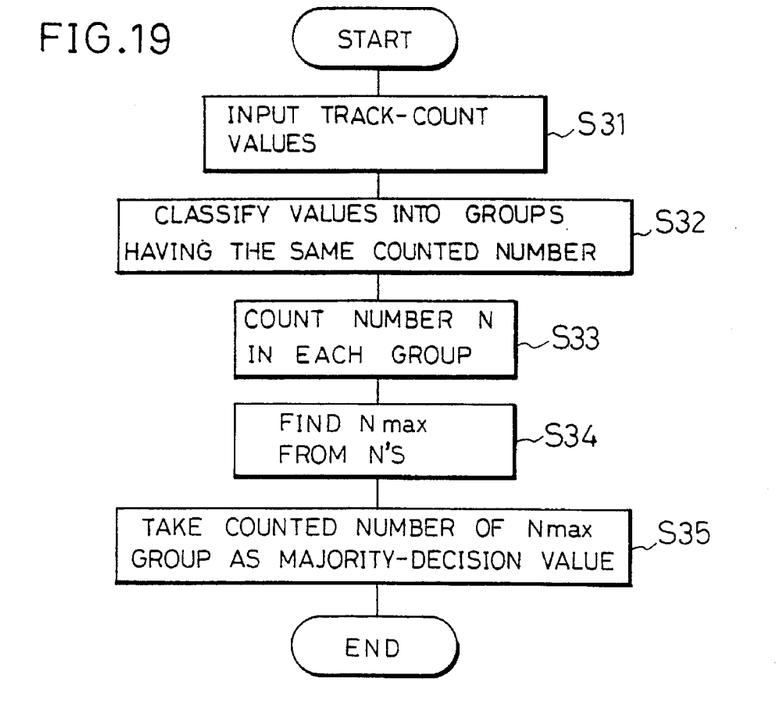
FIG. 19 is a flow chart that shows a sequence of processes for making a decision by majority from track-count values that are counted using multi-beams in the above-mentioned apparatus.

Referring to FIGS. 18 and 19, the following description will discuss still another embodiment of the present embodiment.

As illustrated in FIG. 18, a multi-beam recording-reproduction apparatus of the present embodiment has an arrangement wherein the average-value calculating circuit 41 of the multi-beam recording-reproduction apparatus, which has been described in the fourth embodiment with reference to FIG. 15, is replaced by a majority-decision section 44 for making a decision by majority on the track-count values c1, c2 and c3.

The majority-decision section 44 receives the track-count values c1, c2 and c3, finds a majority-decision value h by making a decision by majority, and then releases the value to the access control section 3. The access control section 3 releases an access signal d to the linear motor for driving the optical head 4, not shown, based on the majority-decision value h, thereby allowing the optical head 4 to move toward a target track.

Referring to a flow chart in FIG. 19, an explanation will be given on the operation of the majority-decision section 44. When a majority-decision operation is started after the track-count values c1, c2 and c3 have been inputted thereto (S31), all the track-count values are first classified into groups, each of which has the same counted number (S32). For example, if $c1=c2 \neq c3$, group A consisting of c1 and c2 and group B consisting of c3 are formed. Next, the number of elements N in each group is counted (S33). In this case, group A has the number of elements N(A)=2, while group B has the number of elements N(B)=1. Then, the maximum value Nmax is found among these numbers of elements (S34). In this case, Nmax=2 holds. Consequently, the counted number of the group having Nmax is used as the majority-decision value h (S35). In the above-mentioned case, the majority-decision value h equals c1.

Additionally, in the case of making a decision by majority on track-count values derived from two light beams, an arrangement may be made so that if the two track-count values match, the track-count value is adopted, and so that if the two track-count values do not match, the track-count value is not adopted as being an erroneous value.

As described above, the majority-decision value h is provided by making a decision by majority on the track-count values derived from a plurality of light beams; therefore, it becomes possible to obtain stable track-count values even if there is noise in reproduced signals or a defective portion in tracks.

Sixth Embodiment

Figure 20:
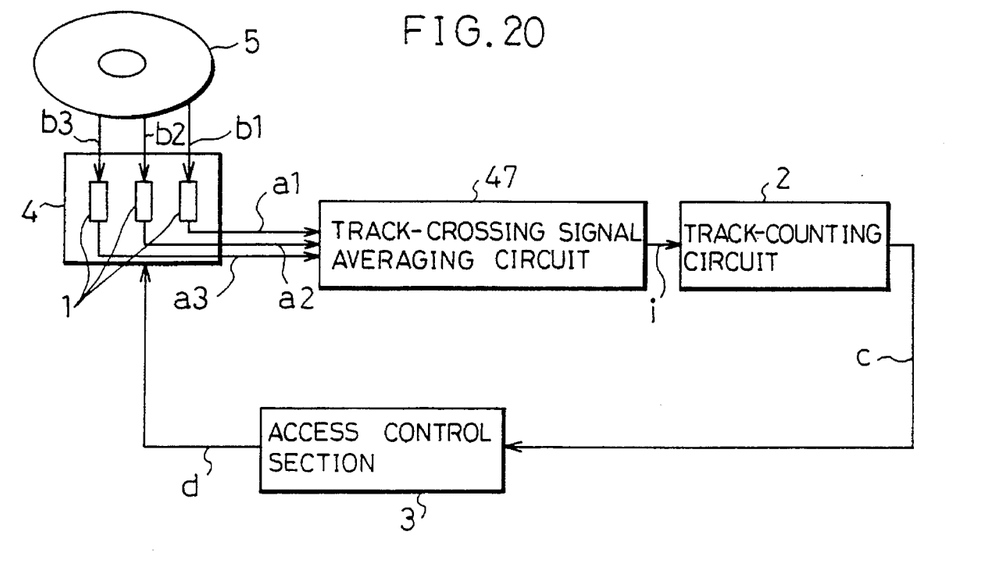
FIG. 20 is a block diagram showing a schematic construction of a multi-beam recording-reproduction apparatus in the other embodiment of the present invention.
Figure 21:
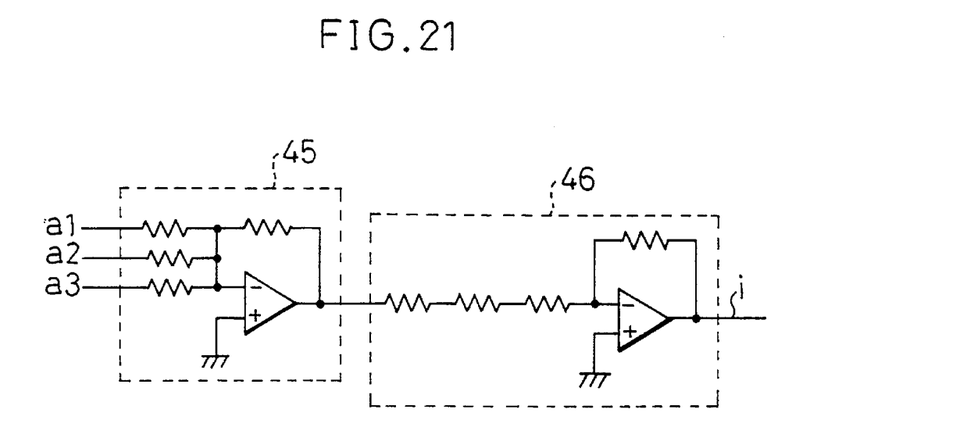
FIG. 21 is a circuit diagram showing an internal construction of a track-crossing-signal averaging circuit in the above-mentioned apparatus.

Referring to FIGS. 20 and 21, the following description will discuss the other embodiment of the present invention.

As illustrated in FIG. 20, in a multi-beam recording-reproduction apparatus of the present embodiment, three track-crossing signal generation sections 1, each described in the first embodiments with reference to FIG. 1, are installed inside the optical head 4 in order to deal with the respective reflected light beams b1, b2 and b3 derived from light beams projected onto the optical disk 5. The track-crossing signal generation section 1 may be constituted of a two-part photodetector, a subtraction circuit and other devices.

Track-crossing signals a1, a2 and a3, which are released from the track-crossing signal generation sections 1 in accordance the reflected light beams b1, b2 and b3, are inputted to a track-crossing signal averaging circuit 47 respectively. Then, the track-crossing signal averaging circuit 47 releases an average track-crossing signal i, which is an average value of the track-crossing signals a1, a2 and a3, to the track-counting circuit 2.

The track-counting circuit 2 releases a track-count value c to the access control section 3 in accordance with the average track-crossing signal i. The access control section 3 releases an access signal d to the linear motor for driving the optical head 4, not shown, based on the track-count value c, thereby allowing the optical head 4 to move toward a target track.

Referring to FIG. 21, an explanation will be given on the operation of the track-crossing signal averaging circuit 47. As shown in FIG. 21, the track-crossing signal averaging circuit 47 is constituted of an adder 45 and a divider 46. The track-crossing signals a1, a2 and a3, which are released from the track-crossing signal generation sections 1, are inputted to the adder 45 that is constituted of an operational amplifier and resistors, and the resulting added signal (a1+a2+a3) is inputted to the divider 46. The divider 46 calculates (a1+a2+a3)/3, thereby resulting in the average track-crossing signal i.

As described above, the track-count value is found based on the average of the track-crossing signals that have been measured by using a plurality of light beams; therefore, it becomes possible to obtain more accurate track-count values even if there is noise in reproduced signals or a defective portion in tracks.

In each of the above-mentioned embodiments, the multi-beam recording-reproduction apparatus has three semiconductor lasers for projecting three light beams; yet, the present invention is not intended to be limited to this arrangement. Another arrangement may be adopted, wherein a plurality of half mirrors are provided so that one light beam may be split into a plurality of light beams. Further, in the above-mentioned embodiments, the track-counting operation is executed in accordance with reflected light beams derived from light beams projected onto the optical disk. However, the present invention is not intended to be limited to this arrangement: this operation may be executed by using transmitted light beams. Moreover, the explanations have been given by exemplifying the optical disk as a recording medium; yet, the present invention is not intended to be limited to this. Other recording media such as cards and tapes may be adopted, and the present invention may be applied to other apparatuses wherein recording media of WORM type and rewritable type are used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-beam recording-reproduction apparatus comprising:

an optical head having at least one light source for projecting a plurality of light beams onto a recording medium, the optical head being allowed to shift relatively with respect to the recording medium;

light-receiving means for receiving reflected light beams or transmitted light beams respectively and releasing electric signals, the reflected light beams or the transmitted light beams being derived from the light beams from the recording medium;

a track-crossing signal generation means for releasing a track-crossing signal in accordance with the electric signal released from the predetermined one of the light-receiving means;

a track-counting means for releasing a track-count value that represents the number of tracks the light beams have crossed over, in accordance with the track-crossing signal; and an access control means for positioning the optical head in accordance with the track-count value wherein the predetermined one of the light-receiving means functions as a light-receiving means for receiving a reflected light beam derived from the endmost one of a bundle of light beams that have been projected from the light source.

2. The multi-beam recording-reproduction apparatus as defined in claim 1, further comprising:

at least one information-signal generation means that is installed for the respective light-receiving means other than the predetermined one of the light-receiving means so as to release an information signal in accordance with the electric signals released from the respective light-receiving means.

3. The multi-beam recording-reproduction apparatus as defined in claim 2, wherein the predetermined one of the light-receiving means, the track-crossing signal generation means, and the track-counting means are constituted of circuits for processing frequencies in lower bands, compared with those of the other light-receiving means and the information-signal generation means.

4. The multi-beam recording-reproduction apparatus as defined in claim 1, further comprising:

information-signal generation means that are installed for the respective light-receiving means including the predetermined one of the light-receiving means so as to release information signals in accordance with the electric signals released from the respective light-receiving means.

5. The multi-beam recording-reproduction apparatus as defined in claim 4, further comprising:

dc-current eliminating means for inputting an ac signal formed by eliminating a dc component from the electric signal to the information-signal generation means.

6. The multi-beam recording-reproduction apparatus as defined in claim 1, wherein the access control means includes:

calculating means for calculating a number of tracks which the optical head has to cross over to reach a target track; and driving means for driving the optical head until the calculated number of tracks comes to equal the track-count value that is released from the track-counting means while the optical head is being driven.

7. A multi-beam recording-reproduction apparatus comprising:

an optical head having at least one light source for projecting a plurality of light beams onto a recording medium, the optical head being allowed to shift relatively with respect to the recording medium;

light-receiving means for receiving reflected light beams or transmitted light beams respectively and releasing electric signals, the reflected light beams or the transmitted light beams being derived from the light beams from the recording medium;

a track-crossing signal generation means for releasing a track-crossing signal in accordance with the electric signal released from the predetermined one of the light-receiving means;

a track-counting means for releasing a track-count value that represents the number of tracks the light beams have crossed over, in accordance with the track-crossing signal;

light-source control means for controlling the light source so that when the optical head makes a seeking operation toward a target track, only one light beam whose reflected light beam is to be received by the predetermined one of the light-receiving means is projected; and an access control means for positioning the optical head in accordance with the track-count value.

8. The multi-beam recording-reproduction apparatus as defined in claim 9, further comprising:

at least one information-signal generation means that is installed for the respective light-receiving means other than the predetermined one of the light-receiving means so as to release an information signal in accordance with the electric signals released from the respective light-receiving means.

9. The multi-beam recording-reproduction apparatus as defined in claim 8, wherein the predetermined one of the light-receiving means, the track-crossing signal generation means, and the track-counting means are constituted of circuits for processing frequencies in lower bands, compared with those of the other light-receiving means and the information-signal generation means.

10. The multi-beam recording-reproduction apparatus as defined in claim 7, further comprising:

information-signal generation means that are installed for the respective light-receiving means including the predetermined one of the light-receiving means so as to release information signals in accordance with the electric signals released from the respective light-receiving means.

11. The multi-beam recording-reproduction apparatus as defined in claim 10, further comprising:

dc-current eliminating means for inputting an ac signal formed by eliminating a dc component from the electric signal to the information-signal generation means.

12. The multi-beam recording-reproduction apparatus as defined in claim 7, wherein the access control means includes:

calculating means for calculating a number of tracks which the optical head has to cross over to reach a target track; and driving means for driving the optical head until the calculated number of tracks comes to equal the track-count value that is released from the track-counting mens while the optical head is being driven.

* * * * *